United States Patent
Ravid et al.

(10) Patent No.: US 8,989,011 B2
(45) Date of Patent: Mar. 24, 2015

(54) COMMUNICATION OVER MULTIPLE VIRTUAL LANES USING A SHARED BUFFER

(71) Applicant: Mellanox Technologies Ltd., Yokneam (IL)

(72) Inventors: Ran Ravid, Tel Aviv (IL); Zachy Haramaty, Hemed (IL); Roy Kriss, Netanya (IL); Oded Wertheim, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 203 days.

(21) Appl. No.: 13/802,926

(22) Filed: Mar. 14, 2013

(65) Prior Publication Data

US 2014/0269711 A1    Sep. 18, 2014

(51) Int. Cl.
*H04L 12/801* (2013.01)
*H04L 12/747* (2013.01)
*H04L 12/879* (2013.01)

(52) U.S. Cl.
CPC .......... *H04L 45/742* (2013.01); *H04L 49/9026* (2013.01)
USPC .......................................... 370/236; 370/412

(58) Field of Classification Search
None
See application file for complete search history.

(56) References Cited

U.S. PATENT DOCUMENTS

| | | | |
|---|---|---|---|
| 5,367,520 A | 11/1994 | Cordell | |
| 5,574,885 A | 11/1996 | Denzel et al. | |
| 6,160,814 A | 12/2000 | Ren et al. | |
| 6,169,748 B1 * | 1/2001 | Barbas et al. | 370/468 |
| 6,347,337 B1 | 2/2002 | Shah et al. | |
| 6,456,590 B1 | 9/2002 | Ren et al. | |
| 6,490,248 B1 | 12/2002 | Shimojo | |
| 6,535,963 B1 | 3/2003 | Rivers | |
| 6,539,024 B1 | 3/2003 | Janoska et al. | |
| 6,606,666 B1 | 8/2003 | Bell et al. | |
| 6,895,015 B1 | 5/2005 | Chiang et al. | |
| 6,922,408 B2 | 7/2005 | Bloch et al. | |
| 6,993,032 B1 | 1/2006 | Dammann et al. | |
| 7,068,822 B2 | 6/2006 | Scott | |
| 7,088,713 B2 | 8/2006 | Battle et al. | |
| 7,131,125 B2 | 10/2006 | Modelski et al. | |
| 7,136,381 B2 | 11/2006 | Battle et al. | |
| 7,190,667 B2 | 3/2007 | Susnow et al. | |
| 7,327,749 B1 * | 2/2008 | Mott | 370/413 |

(Continued)

FOREIGN PATENT DOCUMENTS

| | | |
|---|---|---|
| EP | 1698976 A1 | 9/2006 |
| WO | 03024033 A1 | 3/2003 |

OTHER PUBLICATIONS

U.S. Appl. No. 13/189,593 Notice of Allowance dated Nov. 25, 2013.

(Continued)

*Primary Examiner* — Brian Roberts
(74) *Attorney, Agent, or Firm* — D. Kligler I.P. Services Ltd.

(57) ABSTRACT

A method for communication includes, in a sender node that sends packets to a receiver node over a physical link, making a decision, for a packet that is associated with a respective virtual link selected from among multiple virtual links, whether the receiver node is to buffer the packet in a dedicated buffer assigned to the respective virtual link or in a shared buffer that is shared among the multiple virtual links. The packet is sent, and the decision is signaled, from the sender node to the receiver node.

22 Claims, 2 Drawing Sheets

(56) References Cited

U.S. PATENT DOCUMENTS

| | | | |
|---|---|---|---|
| 7,590,058 B1 | 9/2009 | Cherchali et al. | |
| 7,609,636 B1* | 10/2009 | Mott | 370/235 |
| 7,773,622 B2 | 8/2010 | Schmidt et al. | |
| 7,853,738 B2 | 12/2010 | Pothireddy et al. | |
| 7,936,770 B1 | 5/2011 | Frattura et al. | |
| 8,149,710 B2 | 4/2012 | Bergamasco et al. | |
| 8,270,295 B2 | 9/2012 | Kendall et al. | |
| 8,274,971 B2 | 9/2012 | Battle et al. | |
| 8,478,811 B2 | 7/2013 | Garg et al. | |
| 8,656,188 B2 | 2/2014 | Goodwill et al. | |
| 2001/0043564 A1* | 11/2001 | Bloch et al. | 370/230 |
| 2002/0012340 A1 | 1/2002 | Kalkunte et al. | |
| 2002/0027908 A1 | 3/2002 | Kalkunte et al. | |
| 2003/0048792 A1 | 3/2003 | Xu et al. | |
| 2003/0076849 A1 | 4/2003 | Morgan et al. | |
| 2003/0095560 A1 | 5/2003 | Arita et al. | |
| 2003/0117958 A1* | 6/2003 | Nation et al. | 370/235 |
| 2003/0118016 A1 | 6/2003 | Kalkunte et al. | |
| 2003/0137939 A1 | 7/2003 | Dunning et al. | |
| 2003/0198231 A1 | 10/2003 | Kalkunte et al. | |
| 2003/0198241 A1 | 10/2003 | Putcha et al. | |
| 2003/0200330 A1 | 10/2003 | Oelke et al. | |
| 2004/0066785 A1 | 4/2004 | He et al. | |
| 2005/0135356 A1 | 6/2005 | Muthukrishnan et al. | |
| 2005/0259574 A1 | 11/2005 | Figueira et al. | |
| 2006/0034172 A1* | 2/2006 | Morton | 370/235 |
| 2006/0092842 A1 | 5/2006 | Beukema et al. | |
| 2006/0155938 A1 | 7/2006 | Cummings et al. | |
| 2006/0182112 A1 | 8/2006 | Battle et al. | |
| 2007/0025242 A1 | 2/2007 | Tsang | |
| 2007/0053350 A1* | 3/2007 | Spink et al. | 370/381 |
| 2007/0133415 A1* | 6/2007 | Spink | 370/235 |
| 2009/0003212 A1 | 1/2009 | Kwan et al. | |
| 2009/0010162 A1 | 1/2009 | Bergamasco et al. | |
| 2009/0161684 A1 | 6/2009 | Voruganti et al. | |
| 2010/0100670 A1 | 4/2010 | Jeddeloh | |
| 2010/0325318 A1 | 12/2010 | Desoli et al. | |
| 2011/0058571 A1 | 3/2011 | Bloch et al. | |
| 2011/0289243 A1* | 11/2011 | Takahashi | 710/35 |
| 2013/0028256 A1 | 1/2013 | Koren | |
| 2014/0036930 A1* | 2/2014 | Lih et al. | 370/429 |

OTHER PUBLICATIONS

U.S. Appl. No. 12/876,265 Office Action dated May 1, 2013.
Raatikainen, P., "ATM Switches-Switching Technology S38.3165", Switching Technology, L8-1, 34 pages, year 2006 (http://www.netlab.hut.fi/opetus/s383165).
Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).
Minkenberg et al., "Multistage Interconnection Networks for Data Centers; Bidirectional Fat Tree Construction and Routing for IEEE 802.1au", IBM Research GmbH, Zurich, Switzerland, 9 pages, Jul. 2, 2007.
Infiniband Architecture Release 1.2.1, vol. 1, General specifications, Chapter 7.9, pp. 212-216, Nov. 2007.
U.S. Appl. No. 13/189,593 Office Action dated Jul. 9, 2013.

* cited by examiner

COMMUNICATION OVER MULTIPLE VIRTUAL LANES USING A SHARED BUFFER

FIELD OF THE INVENTION

The present invention relates generally to communications interconnect protocols, and particularly to methods and systems for efficient configuration and management of sending and receiving node buffers.

BACKGROUND OF THE INVENTION

Some communication networks and protocols support the delivery of multiple logical or virtual links over a single physical link. For example, the Infiniband™ link supports multiple virtual links referred to as virtual lanes (VLs). Examples for communication links that may utilize a shared receiving buffer among the different VLs are known in the art.

U.S. Pat. No. 7,327,749, whose disclosure is incorporated herein by reference, describes a system and a method for shared buffering of InfiniBand virtual lanes and queue pairs. Instead of allocating dedicated memory space (e.g. a set of FIFO queues), a shared memory dynamically accommodates traffic received on different virtual lanes and/or queue pairs of an InfiniBand network.

U.S. Pat. No. 7,609,636, whose disclosure is incorporated herein by reference, describes a system and a method for implementing flow control, at the link and/or transport layers, for InfiniBand receive traffic. A shared memory structure may be used for combined queuing of virtual lane and queue pair traffic. Each virtual lane is allocated a number of memory buffers.

U.S. Pat. No. 8,149,710, whose disclosure is incorporated herein by reference, describes a method comprising the following steps: A first set of inputs is received, comprising a first pluralities of entities and a first traffic behavior; a first region of a buffer corresponding to the first traffic behavior is determined; the first plurality of entities is assigned to the first region; hierarchical relationships between at least some of the first plurality entities is determined; a first shared buffer space is determined; and at least one threshold for each of the first plurality of entities is assigned. The threshold may comprise a maximum amount of the first shared buffer space that may be allocated to an entity.

SUMMARY OF THE INVENTION

An embodiment of the present invention that is described herein provides a method for communication. The method includes, in a sender node that sends packets to a receiver node over a physical link, making a decision, for a packet that is associated with a respective virtual link selected from among multiple virtual links, whether the receiver node is to buffer the packet in a dedicated buffer assigned to the respective virtual link or in a shared buffer that is shared among the multiple virtual links. The packet is sent, and the decision is signaled, from the sender node to the receiver node.

In some embodiments, making the decision includes receiving from the receiver node credit reports that are indicative of an available space in each of the dedicated buffers and in the shared buffer, and making the decision depending on the credit reports. In other embodiments, making the decision includes deciding to buffer the packet in the shared buffer if the shared buffer has the available space for buffering the packet, and to buffer the packet in the dedicated buffer only if the shared buffer does not have the available space.

In an embodiment, signaling the decision includes assigning a value indicative of the decision to a bit in a header of the packet. In another embodiment, signaling the decision includes sending the decision in a signaling command separate from the packet. In an embodiment, sending the packet includes sending in a header of the packet both a first field indicating the decision and a second field indicating the virtual link.

There is additionally provided, in accordance with an embodiment of the present invention, a method including, in a receiver node that receives packets sent from a sender node over a physical link, receiving a packet that is associated with a respective virtual link selected from among multiple virtual links. An instruction is received from the sender node, instructing whether to buffer the packet in a dedicated buffer assigned to the respective virtual link or in a shared buffer that is shared among the multiple virtual links. The packet is buffered in the dedicated buffer or in the shared buffer in accordance with the instruction.

In some embodiments, receiving the instruction includes receiving a bit value indicative of the instruction in a header of the packet. In other embodiments, receiving the instruction includes receiving the instruction in a signaling command separate from the packet. In an embodiment, receiving the packet includes receiving in a header of the packet both a first field indicating the instruction and a second field indicating the virtual link. Other embodiments include advertising from the receiver node respective credit values, which are indicative of an available space in the shared buffer and in each of the dedicated buffers.

There is also provided, in accordance with an embodiment that is described herein, a communication node including an output circuit and a controller. The output circuit is configured to send data packets to a receiver node over a physical link. The controller is configured to make a decision, for a packet that is associated with a respective virtual link selected from among multiple virtual links, whether the receiver node is to buffer the packet in a dedicated buffer assigned to the respective virtual link or in a shared buffer that is shared among the multiple virtual links, and to send the packet and signal the decision to the receiver node via the output circuit.

There is additionally provided, in accordance with an embodiment that is described herein, a communication node including an input circuit and a controller. The input circuit is configured to receive data packets from a sender node over a physical link. The controller is configured to receive from the sender node a packet that is associated with a respective virtual link selected from among multiple virtual links, to receive from the sender node an instruction whether to buffer the packet in a dedicated buffer assigned to the respective virtual link or in a shared buffer that is shared among the multiple virtual links, and to buffer the packet in the dedicated buffer or in the shared buffer, in accordance with the instruction.

The present invention will be more fully understood from the following detailed description of the embodiments thereof, taken together with the drawings in which:

DETAILED DESCRIPTION OF EMBODIMENTS

Overview

Packet data communication networks enable connectivity between network elements. Examples of network elements are processor nodes such as servers or computing hosts, and I/O peripheral devices such as storage disks and arrays. A network switch or a router is also referred to as a network element. For a given link between two network elements, the element sending the data is referred to herein as a sender node, and the element receiving the data is referred to as a receiver node. A sender node interconnects to a receiver node via a physical link. The physical link imposes limits on the maximal data rate and the minimal propagation delay or round trip time (RTT) over the link.

In some networks, sender and receiver nodes support the delivery of multiple virtual links over a single physical link. An example of a communication network standard supporting multiple virtual lanes is the Infiniband™ standard, in which the virtual links are referred to as virtual lanes (VLs).

Embodiments of the present invention that are described herein provide improved methods and systems for data packet communication over multiple VLs. The methods and systems described herein allocate at the receiver node a shared buffer, which is shared among the multiple VLs, as well as a respective dedicated buffer per each VL. Additionally, the receiver node calculates and advertises a respective credit value for flow control for the shared buffer and for each of the VL buffers.

Based on the credit values advertised by the receiver node, the sender node informs the receiver node whether to store sent data in the shared buffer or in one of the VL buffers. In an example embodiment, the sender node instructs the receiver node to buffer the data in the shared buffer as long as the shared buffer has sufficient credit. If not, the sender node reverts to instruct the receiver node to buffer the data in the dedicate buffer.

In the presented embodiments, RTT may affect the required size of the shared buffer but not the size of the individual buffers per VL. In an example embodiment, the shared buffer is dimensioned depending on the RTT, while the dedicated buffers are kept small, on the order of a single Maximum Transmission Unit (MTU). This configuration enables communication with a large number of VLs over a long-haul link, with feasible overall memory size for buffering. Without the presented techniques, one can either send data over a long-haul link with very few VLs, or many VLs over a short-haul link, but not both.

System Description

Figure 1:
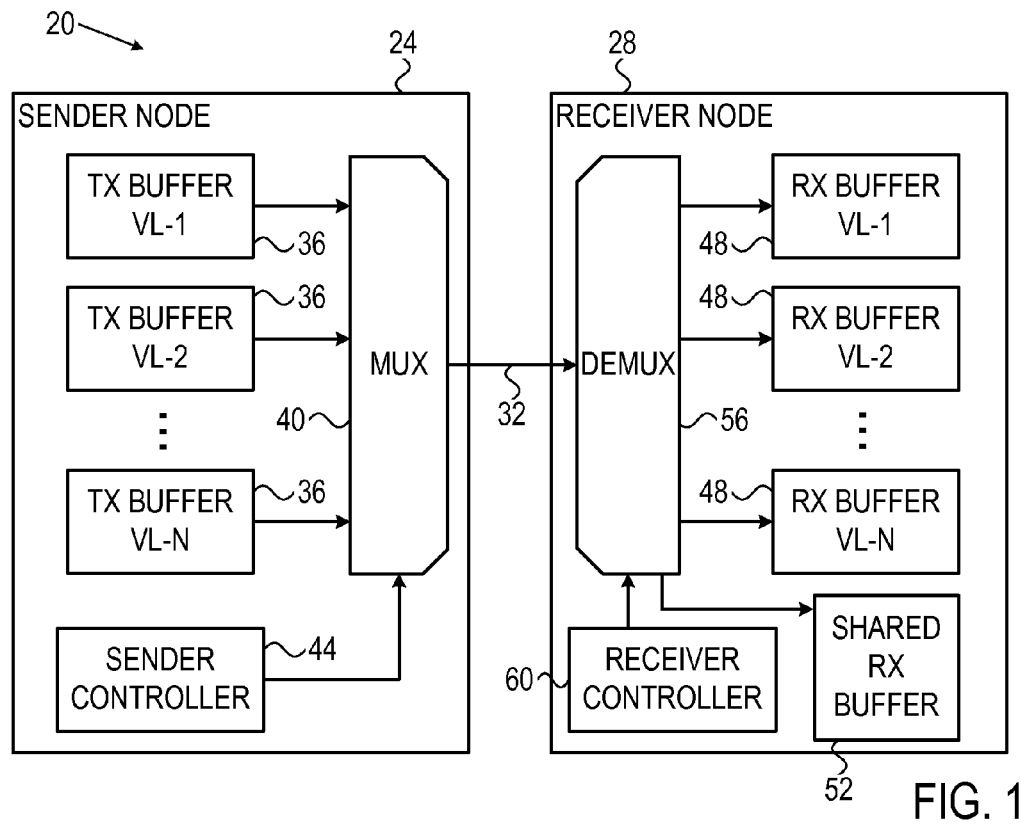
FIG. 1 is a block diagram that schematically illustrates a communication system for sending packet data over multiple virtual lanes, in accordance with an embodiment of the present invention.

FIG. 1 is a block diagram that schematically illustrates a communication system 20 for sending packet data over multiple virtual lanes, in accordance with an embodiment of the present invention. System 20 comprises a sender node 24 and a receiver node 28. Each of the nodes may comprise, for example, a network element such as a switch or a Network Interface Card (NIC) of a compute node, or any other suitable node.

A physical link 32 connects between the sender node and the receiver node. Link 32 may comprise, for example a network link that is part of a communication network that serves nodes 24 and 28. In the present example, link 32 comprises a long-haul link, e.g., on the order of 1 Km or more.

In the present example, nodes 24 and 28 communicate with one another over link 32 in accordance with the Infiniband specification. Alternatively, however, nodes 24 and 28 may operate in accordance with any other suitable communication protocol that supports virtual links.

Figure 2:
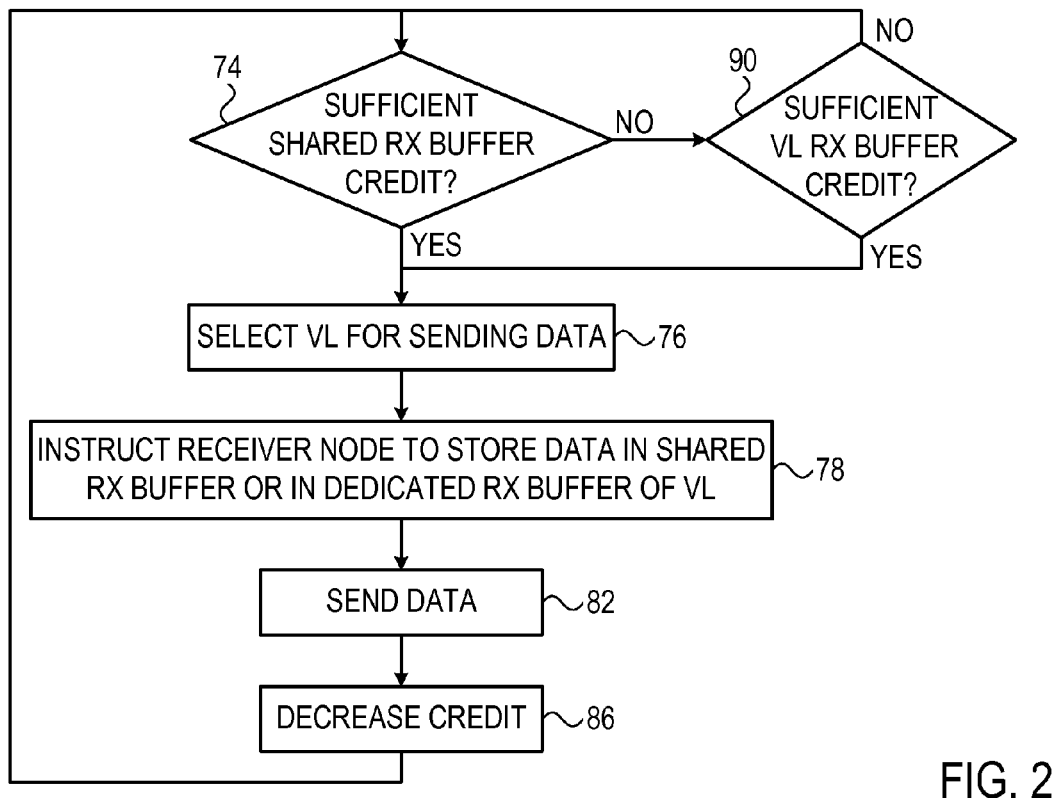
FIG. 2 is a flow chart that schematically illustrates a method for sending packet data over multiple virtual lanes, in accordance with an embodiment of the present invention.

Sender node 24 further comprises multiple virtual lane TX buffers 36. TX Buffers 36 store packet data to be sent over link 32 to receiver node 28. Each of the TX buffers is dedicated to one of N virtual lanes shown in FIG. 1 as VL-1 to VL-N. A MUX component 40 selects which of the virtual lane TX buffers is multiplexed to the sender node output. MUX 40 thus serves as an output circuit for the sender node. A sender controller 44 determines a selection mode for the MUX component and performs various other management tasks of the sender node. Example methods are shown in FIG. 2 below.

Figure 3:
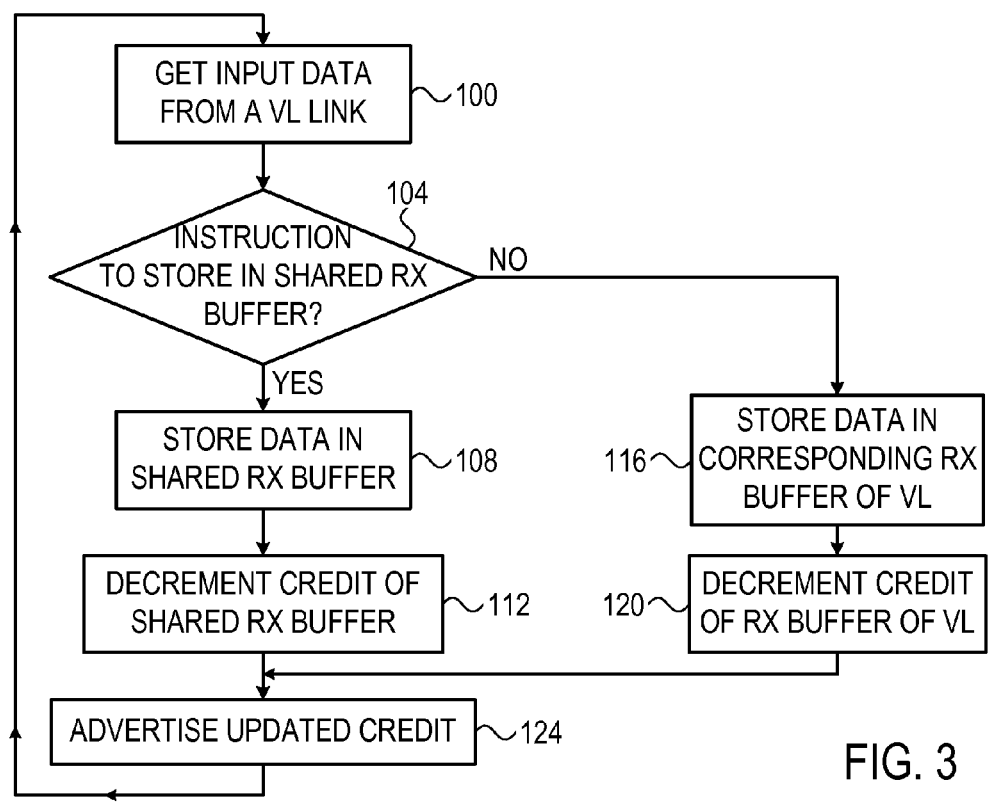
FIG. 3 is a flow chart that schematically illustrates a method for receiving and storing packet data over a virtual lane link, in accordance with an embodiment of the present invention.
Figure 4:
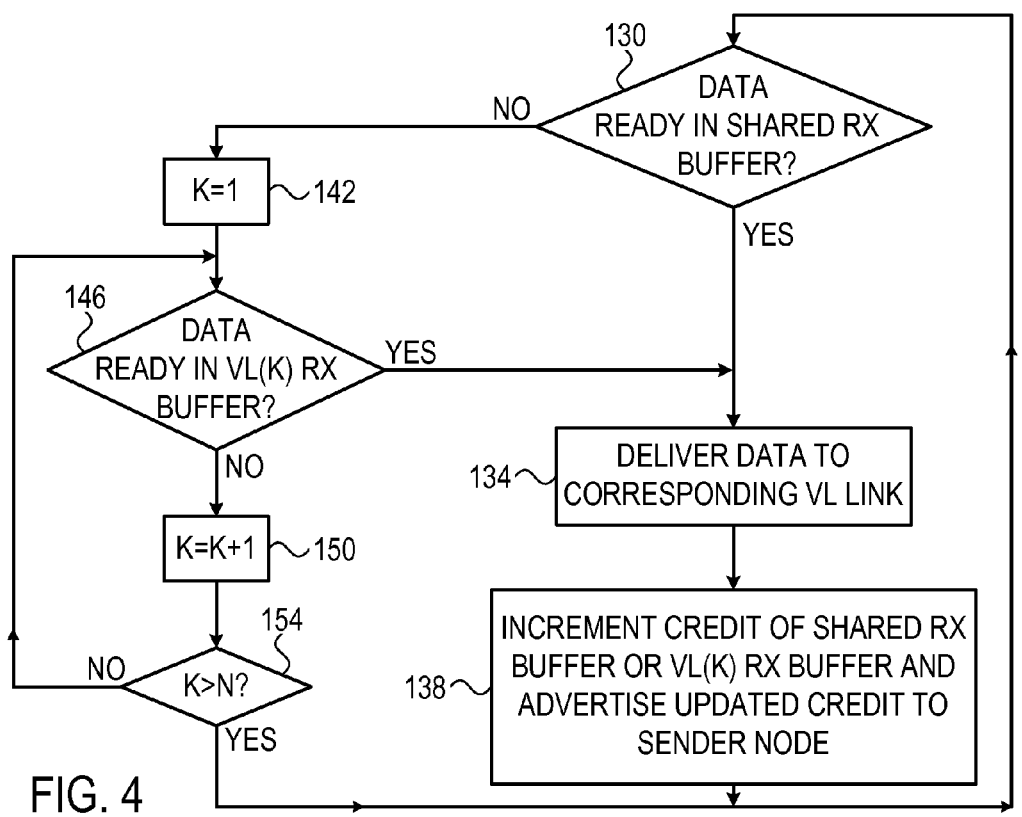
FIG. 4 is a flow chart that schematically illustrates a method for delivering data out of a receiving node, in accordance with an embodiment of the present invention.

Receiver node 28 comprises N virtual lane RX buffers 48. Each RX buffer 48 is associated with a corresponding TX buffer 36 at the sender node, to make a buffer pair. Each of the buffer pairs handles the communication over a corresponding virtual lane link. Receiver node 28 further comprises a shared RX buffer 52. The shared RX buffer may store data received over any of the VLs. A DEMUX component 56 accepts data sent from VL TX buffers 36 over link 32 and transfers it to either shared RX buffer 52, or to a corresponding paired VL RX buffer 48. DEMUX 56 thus serves as an input circuit for the receiver node. A receiver controller 60 determines a selection mode for the DEMUX component 56, and performs various other management tasks of the receiver node. Example methods are shown in FIGS. 3 and 4 below.

Sender node 24 and receiver node 28 together incorporate a credit-based flow control mechanism (not shown in the figure). Flow control prevents sending data too fast and possibly overfilling the receiver node's buffers. Receiver node 28 assigns a separate credit value for each of the VL RX buffers and for the shared RX buffer. For each RX buffer, the receiver node may advertise to the sender node a positive credit value to signal the sender it is ready to accept a certain amount of data in that RX buffer.

Upon storing received data in one of its buffers, the receiver node decreases the respective credit value by the amount of data stored. Upon delivering data from one of its buffers to the node output, the receiver node increases the respective credit value by the amount of data delivered. The receiver node occasionally advertises to the sender the updated credit value. For example, to prevent overfilling RX buffers, the receiver node may advertise an updated credit as soon as the credit decreases. As another example, to allow maximal transmission rate, the receiver may advertise an updated credit as soon as the credit increases.

The Sender node locally stores and keeps track of the credit values sent by the receiver node. When receiving an advertised credit value, the sender node stores the new credit of the respective VL RX buffer or the shared RX buffer. When sending data from a VL TX buffer towards a paired VL RX buffer or to the shared RX buffer, the sender decreases the respective stored credit by the amount of data sent. When sender node 24 selects one of its VL TX buffers for transmission, it is allowed to send data via MUX 40 only if the stored credit of either the shared RX buffer or the respective VL RX buffer is sufficient, i.e., the amount of data to send does not exceed the credit.

The sender and receiver nodes may use any suitable credit value type, which is indicative of the available buffer space, for the flow control mechanism. For example, the credit value may count a number of bytes or a number of chunks of bytes or packets. Alternatively, the credit value may represent a fraction of a predefined value such as a buffer size value.

Communication is carried out by sending data packets from the sender node to the receiver node. The sender node may also send larger messages comprising multiple packets. The maximal unit of data that can be transmitted over the link is defined as the Maximum Transmission Unit (MTU), measured in bytes. As an example, the allowed MTU size in Infiniband ranges between 256 bytes and 4 Kbytes.

In order to fully utilize the link (sometimes referred to as utilizing the link "at wire-speed") a VL should continuously send data at the sender node. To achieve wire-speed utilization with credit-based flow control, the VL RX buffer at the receiver side should typically be configured to a size no less than (2*MTU+RTT*DataRate) bytes, DataRate being the number of bytes sent over the VL link per second. For example, when sending data at 100 Gbit/sec over a 1 Km long link over an Infiniband VL, the expression 2*MTU equals 8 Kbytes at most, and the expression RTT*DataRate equals 125 Kbytes (assuming a typical RTT of 10 μs).

The calculations in the example above demonstrate that for high-rate long-haul links, the required VL RX buffer size may increase significantly due to a long RTT. Without the use of a shared RX buffer and dedicated RX buffers as in the disclosed techniques, this size increase would be doubled N times for a receiver node supporting N VLs.

The receiver node may select any suitable size for the shared and the RX buffers. In an embodiment of the present invention each of the VL RX buffers may be configured to store up to one MTU bytes of data, and the shared RX buffer may be configured to store up to (2*N*MTU+RTT) bytes of data. In such a configuration there is a saving of (N−1) *RTT*DataRate bytes with respect to the Infiniband standard configuration. For determining the best buffers size, RTT may be statically configured and/or estimated, for example periodically and/or when the nodes are initiated.

The sender and receiver nodes may implement the shared and the TX or RX buffers with any suitable memory configurations. For example, a node can comprise a single memory device partitioned to multiple buffers with static or dynamic partitioning. Alternatively, a node can comprise multiple memory devices, for example one memory device per buffer, or any other suitable configuration. In some embodiments the buffers may be arranged as a linked list or as any other suitable data structure within the memory device.

In the exemplary system configuration shown in FIG. 1, each node functions either as a sender or as a receiver node. In alternative embodiments, however, each network node may serve as both sender and receiver nodes.

The node configurations shown in FIG. 1 are example configurations, which are chosen purely for the sake of conceptual clarity. In alternative embodiments, any other suitable sender and/or receiver node configurations can be used. Certain node elements may be implemented using hardware/firmware, such as using one or more Application-Specific Integrated Circuits (ASICs) or Field-Programmable Gate Arrays (FPGAs). Alternatively, some node elements may be implemented in software or using a combination of hardware/firmware and software elements.

In some embodiments, certain node functions, such as certain functions of controller 44 and/or controller 60, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Transmission and Reception Using Shared RX Buffer

FIG. 2 is a flow chart that schematically illustrates a method for sending packet data over multiple virtual lanes, in accordance with an embodiment of the present invention. The method of FIG. 2 begins with sender controller 44 checking if the credit of shared RX buffer 52 is sufficient, at a check shared buffer's credit step 74. Sufficient credit in the current context means that the stored credit is no less than the size of the packet to be sent. In some embodiments the size of the packet to be sent may not be available to the sender controller. In such embodiments, the sender controller may check if the credit value is no less than the maximal packet size or MTU.

If at step 74 sufficient credit is found, i.e., one or more VLs has a packet to send whose size does not exceed the credit, the sender controller selects a TX VL buffer at a select VL step 76. The sender controller may use any suitable method for selecting a specific VL TX buffer among those VLs that the shared RX buffer credit is sufficient for them. For example, the sender controller can select the next or preceding VL TX buffer with respect to the last selected VL TX buffer. Alternatively or additionally the sender controller can select a VL TX buffer based on pre-configured or dynamically adjusted priority settings for the VLs. Further alternatively it can randomly select a VL TX buffer based on a configured statistical distribution such as a uniform distribution or some other distribution that may give statistical priority to some VLs over the others.

If step 76 followed step 74, the sender controller sets a shared buffer bit in the packet header, at a bit setting step 78. A set bit instructs the receiver node to store the received packet data in the shared RX buffer.

Following the bit setting step, the sender node sends the packet data from the selected VL TX buffer at a sending data step 82. The sender controller first configures MUX 40 to output data sent from the selected VL TX buffer. Then the data is directed via the MUX towards link 32. The sender node may send at step 82 one or more packets if the aggregated size does not exceed the credit value.

The sender controller decreases the stored credit of the respective VL RX buffer or the shared RX buffer at a decrease credit step 86. The credit value is decreased by the amount of data sent. The sender controller then returns to step 74 to check for sufficient shared RX buffer credit.

In case the stored credit value of the shared RX buffer at step 74 is found to be non-sufficient for all the VLs, the sender controller checks if any of the stored credit values of the dedicated VL RX buffers is sufficient, at a check VL buffer credit step 90. At step 90, the sender controller may find multiple dedicated Rx buffers with sufficient credit. If at step 90 there is no sufficient credit, e.g. none of the dedicated VL RX buffers at the receiver node has sufficient room for the packet to be sent from the corresponding VL TX buffer, the sender node cannot send any data and returns to step 74 to check for sufficient shared RX buffer credit.

If at step 90 at least one sufficient credit is found, the sender controller proceeds to select VL step 76. At step 76 the sender controller selects among the VLs with sufficient dedicated RX buffer credit, a respective VL TX buffer for sending. The sender controller clears the shared buffer bit in the packet header, at a clear bit step 78. A cleared bit instructs the receiver node to store the received data in a respective VL RX buffer and not in the shared RX buffer.

Following step 78, the sender node sends the data and decreases the respective stored credit value at steps 82 and 86 respectively, as described above (but in this case for the dedicated RX buffer of the VL).

At step 82 the sender node may use any suitable method for determining the amount of data to send. Generally, there is no need that the amount of sent data will match the exact credit value.

At steps 74 and 90 above, by setting a bit, the sender node instructs the receiver node to store the received data in the shared RX buffer, and by clearing the bit the sender node instructs the receiver node to store the data in the respective VL RX buffer. In other words, the packet header comprises two separate fields—One field for specifying the VL of the packet, and another field for instructing the receiver node whether to buffer the packet in the dedicated RX buffer of this VL or in the shared RX buffer. In an alternative embodiment, the bit value logic can be reversed, i.e., store in the shared RX buffer if the bit is cleared and store in a VL RX buffer otherwise. In yet another alternative embodiment, any other indication method can be used. For example the sender node can send a dedicated command packet, or include in the data packet or in another command packet any other indication.

In the method described in FIG. 2 above, the sender controller first checks for sufficient credit in the shared or dedicated RX buffers, and then selects a TX VL buffer for sending. In an alternative embodiment, however, the sender controller may first select a TX VL buffer for sending and then check for sufficient credit.

FIG. 3 is a flow chart that schematically illustrates a method for receiving and storing packet data over a virtual lane link, in accordance with an embodiment of the present invention. The method of FIG. 3 begins with receiver node 28 getting an input packet, at a getting packet step 100. The input packet was sent from one of multiple VL TX buffers 36. The receiver controller checks if the shared buffer bit is set, at a checking indication step 104. In the present embodiment the indication is implemented by a bit set or cleared in the packet header. If the indication bit is set, the receiver controller stores the packet data in the shared RX buffer, at a store in shared buffer step 108.

The receiver controller decrements the credit value of the shared RX buffer at a decrement credit step 112. The credit value is typically decremented by the amount of data stored in the shared RX buffer.

If at step 104 the indication bit is found to be cleared, the receiver controller stores the packet data in a VL RX buffer, at a store in VL buffer step 116. The packet data is stored in the VL RX buffer that is paired to the corresponding sending VL TX buffer. The receiver controller then decrements the credit value of the respective VL RX buffer at a decrement VL buffer credit step 120. The credit value is decremented by the amount of data stored in the respective VL RX buffer.

Following steps 112 or 120, the receiver node advertises the updated credit value to the sender node at an advertise credit step 124. The receiver node may use any suitable method for advertisement. For example, the receiver node can send to the sender node a dedicated command that includes the updated credit value. In another embodiment the communicating nodes may operate bidirectional communication. In this case the receiver node may send the advertised credit value over a data packet header towards the sender node. In an alternative embodiment, the receiver node may advertise updated credit values occasionally as found suitable, and not necessarily immediately following steps 112 or 120.

After advertising the updated credit value, the receiver controller returns to step 100 to get another input packet.

At step 104 above, a bit in the data packet's header indicates whether to store received data in the shared RX buffer or in the respective VL RX buffer. In an alternative embodiment, as described in FIG. 2 above, any other indication method can be used.

FIG. 4 is a flow chart that schematically illustrates a method for delivering data out of receiver node 28, in accordance with an embodiment of the present invention. The method of FIG. 4 begins with receiver controller 60 checking for new stored data in the shared RX buffer, at a check for new data step 130.

If at step 130 the receiver controller identifies new stored data in the shared RX buffer, the receiver delivers the data to the receiver node output at a deliver data step 134. Although the data is stored in the shared RX buffer, the receiver controller is aware of the VL it belongs to, and delivers it to the respective VL link at the output.

The receiver controller increments the credit value at an increment credit and advertise step 138. In case the delivered data at step 134 originated from the shared RX buffer, the credit value of the shared RX buffer is incremented by the amount of data delivered to the output. Still at step 138, the receiver node advertises the updated credit value to the sender node similarly to the description at step 124 above. Following step 138 the receiver controller returns to step 130 to check if new stored data is ready in the shared RX buffer.

If at step 130 above the receiver controller does not find any new data stored in the shared RX buffer, the receiver controller proceeds to search for new stored data in the VL RX buffers. The receiver controller resets an integer variable K to the value of one, at a reset K step 142. The variable K is used to index individual VL RX buffers.

The receiver controller next checks if there is any new data stored in the VL RX buffer indexed by the K integer, at a check for VL data step 146. If the RX buffer indexed by K contains new data, the receiver controller proceeds to steps 134 and 138 described above. In this case, however, following step 146, data is delivered out of the VL RX buffer indexed by K and not out of the shared RX buffer. In addition, at step 138, the receiver controller now increments the credit of the VL RX buffer indexed by K and not the credit of the shared RX buffer.

If at step 146 above the receiver controller found no new data stored, it increments the index K by one, at an increment K step 150. The receiver controller then checks if K is larger than N, the total number of VLs, at a loop condition step 154.

If at step 154 the incremented value of K does not exceed N, the receiver controller continues to search for data in the VL RX buffers by returning to step 146. Otherwise, the receiver controller could not find any new data stored in the VL RX buffers and returns to step 130.

The receiver controller may use any suitable method for checking for new received data at step 130 or 146 above. For example, the receiver controller can set a respective buffer identifier when data is stored in the shared RX buffer or in a VL RX buffer, and periodically check this identifier to locate new data stored. Alternatively a hardware interrupt may trigger step 130 or 146 when new received data is stored.

Alternatively to the embodiment described in FIG. 4 above, the receiver controller may loop over all the VL RX buffers even if it finds new data in one or more RX buffers at step 146. In this embodiment, after delivering data from the VL RX buffer indexed by K at step 134, and incrementing K and advertising the updated credit at step 138, the receiver controller returns to step 150 to increment K for searching for new data in the next VL RX buffer.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   in a sender node that sends packets to a receiver node over a physical link, making a decision, for a packet that is associated with a respective virtual link selected from among multiple virtual links, whether the receiver node is to buffer the packet in a dedicated buffer assigned to the respective virtual link or in a shared buffer that is shared among the multiple virtual links; and
   sending the packet, and signaling the decision, from the sender node to the receiver node.

2. The method according to claim 1, wherein making the decision comprises receiving from the receiver node credit reports that are indicative of an available space in each of the dedicated buffers and in the shared buffer, and making the decision depending on the credit reports.

3. The method according to claim 2, wherein making the decision comprises deciding to buffer the packet in the shared buffer if the shared buffer has the available space for buffering the packet, and to buffer the packet in the dedicated buffer only if the shared buffer does not have the available space.

4. The method according to claim 1, wherein signaling the decision comprises assigning a value indicative of the decision to a bit in a header of the packet.

5. The method according to claim 1, wherein signaling the decision comprises sending the decision in a signaling command separate from the packet.

6. The method according to claim 1, wherein sending the packet comprises sending in a header of the packet both a first field indicating the decision and a second field indicating the virtual link.

7. A method for communication, comprising:
   in a receiver node that receives packets sent from a sender node over a physical link, receiving a packet that is associated with a respective virtual link selected from among multiple virtual links;
   receiving from the sender node an instruction whether to buffer the packet in a dedicated buffer assigned to the respective virtual link or in a shared buffer that is shared among the multiple virtual links; and
   buffering the packet in the dedicated buffer or in the shared buffer, in accordance with the instruction.

8. The method according to claim 7, wherein receiving the instruction comprises receiving a bit value indicative of the instruction in a header of the packet.

9. The method according to claim 7, wherein receiving the instruction comprises receiving the instruction in a signaling command separate from the packet.

10. The method according to claim 7, wherein receiving the packet comprises receiving in a header of the packet both a first field indicating the instruction and a second field indicating the virtual link.

11. The method according to claim 7, and comprising advertising from the receiver node respective credit values, which are indicative of an available space in the shared buffer and in each of the dedicated buffers.

12. A communication node, comprising:
    an output circuit, which is configured to send data packets to a receiver node over a physical link; and
    a controller, which is configured to make a decision, for a packet that is associated with a respective virtual link selected from among multiple virtual links, whether the receiver node is to buffer the packet in a dedicated buffer assigned to the respective virtual link or in a shared buffer that is shared among the multiple virtual links, and to send the packet and signal the decision to the receiver node via the output circuit.

13. The communication node according to claim 12, wherein the controller is configured to receive from the receiver node credit reports that are indicative of an available space in each of the dedicated buffers and in the shared buffer, and to make the decision depending on the credit reports.

14. The communication node according to claim 13, wherein the controller is configured to decide to buffer the packet in the shared buffer if the shared buffer has the available space for buffering the packet, and to decide to buffer the packet in the dedicated buffer only if the shared buffer does not have the available space.

15. The communication node according to claim 12, wherein the controller is configured to signal the decision by assigning a value indicative of the decision to a bit in a header of the packet.

16. The communication node according to claim 12, wherein the controller is configured to signal the decision by sending the decision in a signaling command separate from the packet.

17. The communication node according to claim 12, wherein the controller is configured to send in a header of the packet both a first field indicating the decision and a second field indicating the virtual link.

18. A communication node, comprising:
    an input circuit, which is configured to receive data packets from a sender node over a physical link; and
    a controller, which is configured to receive from the sender node a packet that is associated with a respective virtual link selected from among multiple virtual links, to receive from the sender node an instruction whether to buffer the packet in a dedicated buffer assigned to the respective virtual link or in a shared buffer that is shared among the multiple virtual links, and to buffer the packet in the dedicated buffer or in the shared buffer, in accordance with the instruction.

19. The communication node according to claim 18, wherein the controller is configured to receive the instruction by receiving a bit value indicative of the instruction in a header of the packet.

20. The communication node according to claim 18, wherein the controller is configured to receive the instruction in a signaling command separate from the packet.

21. The communication node according to claim 18, wherein the controller is configured to receive in a header of the packet both a first field indicating the instruction and a second field indicating the virtual link.

22. The communication node according to claim 18, wherein the controller is configured to advertise to the sender node respective credit values, which are indicative of an available space in the shared buffer and in each of the dedicated buffers.

* * * * *